Oct. 31, 1944.   M. B. VILENSKY   2,361,578
PLATINUM-NICKEL ALLOY
Filed Dec. 15, 1938

INVENTOR
Michel B. Vilensky,
BY
ATTORNEYS

UNITED STATES PATENT OFFICE 2,361,578

PLATINUM-NICKEL ALLOY

Michel B. Vilensky, Newark, Ohio, assignor to Owens-Illinois Glass Company, a corporation of Ohio Application December 15, 1938, Serial No. 245,923

2 Claims. (Cl. 49—55)

The present invention relates to platinum alloy compositions particularly designed for use in glass working apparatus. This alloy finds particular use in feeder outlets such as illustrated and described in the Slayter and Thomas U. S. Patents Nos. 2,133,236 and 2,133,238, or British Patents Nos. 482,532 and 482,085. The present invention is adapted for use in the manufacture of bushings such as illustrated in the French Patent 815,503, such bushings being suitable for use in the production of fibrous glass. The invention also finds use in various forms of glass handling equipment such, for example, as illustrated in U. S. Patent to Weller, 2,031,083.

Heretofore, in the aforementioned art, various two-component noble metal alloys have been mentioned, the most common of which has been a platinum rhodium alloy. Among the objections of such an alloy are the high cost of the rhodium, especially since about 10% is generally required, and the fact that as the alloy is heated and occasionally reworked a portion of the rhodium gradually volatilizes.

One of the objects of the present invention is to overcome the foregoing objections and produce an alloy suitable for glass working or similar types of apparatus.

Another object of the present invention is to provide an alloy which may utilize a base metal in its composition in order to impart desired physical and chemical properties to the alloy and at the same time lessen the cost thereof.

Another object of the invention is to produce an alloy which has hardness coupled with ductility suitable for working into desired form of exact dimensions as required in glass feeders, especially for fibrous glass.

Another object is to provide such an alloy which is stable up to high temperatures and permits the melting and handling of glasses having melting points up to at least 2800° F.

Another object is to provide an alloy which is stable to chemical actions of any kind with molten soda-lime-silicate, or borosilicate glasses, or other types of glasses commonly used which are free, however, from ingredients which attack platinum at the melting temperatures of any of the commonly known glasses.

It is another object to produce an alloy which will withstand physical action and abrasion of any common types of glass flowing over the surface thereof.

A characteristic feature of the novel alloy herein disclosed is that it is capable of being given a very smooth surface, thereby reducing to a minimum the friction of the molten glass flowing thereover.

Still another object of the invention is to provide an alloy of the character indicated which will retain its chemical and physical properties after it has been reworked, remelted and re-rolled.

It is also an object of the present invention to reduce to a minimum the loss of the platinum by volatilization when subjected to high temperatures, and for the attainment of this object, the invention provides a platinum base metal alloy so constituted that if volatilization takes place, the base metal will volatilize first, thus preserving and holding the platinum substantially intact.

Other objects and advantages of the present invention will become apparent from the following description.

Referring to the accompanying drawing which illustrates a furnace including a feeder which may be composed of an alloy such as herein described and claimed:

Figure 1:
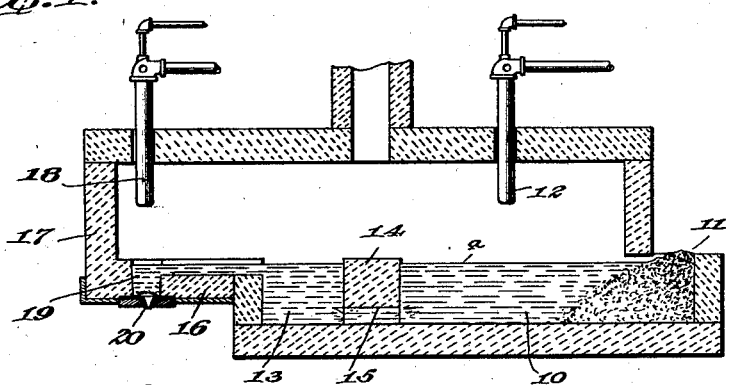
Fig. 1 is a longitudinal sectional elevation of the furnace.
Figure 2:
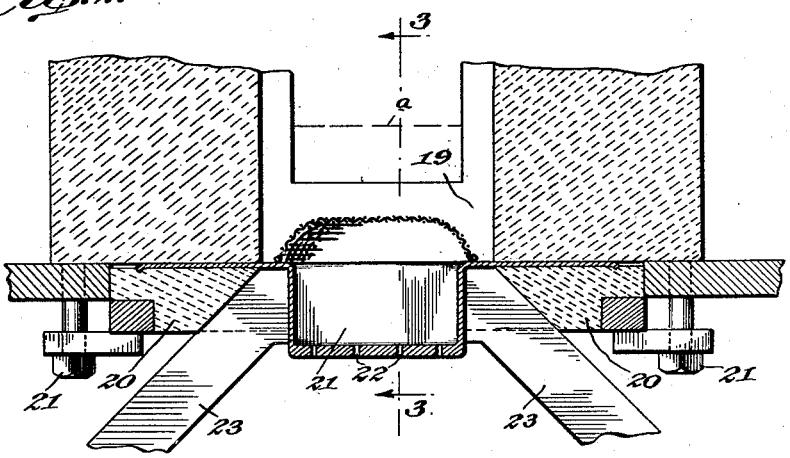
Fig. 2 is a sectional elevation through the feeder on a larger scale.
Figure 3:
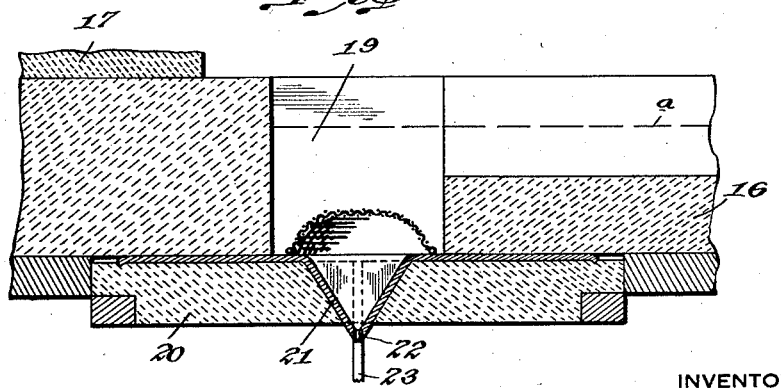
Fig. 3 is a section at the line 3—3 on Fig. 2.

The furnace, which is built of refractory material, comprises a melting compartment 10 into which the batch of raw material is introduced at a dog house 11, said material being melted by means of a burner 12. The furnace also comprises a refining compartment 13 separated from the melting compartment by a wall 14, said compartments being in communication through a throat or passageway 15. The glass $a$ flows from the refining compartment into a forehearth comprising a floor 16 and a front wall 17. A burner 18 may be provided for raising the temperature of the glass within the forehearth. The forehearth is provided adjacent its forward end with a well 19 extending downward through the floor. A refractory bushing 20 is located beneath the well and held in position as by means of bolts 21. The bushing is formed with an outlet opening extending therethrough. A metallic element 21, which forms a lining for said outlet opening and which serves as a feeder for the molten glass, consists of a platinum-nickel alloy such as hereinafter described. Said feeder, which is V-shaped in cross section, is provided with a series of outlet openings 22 through which the molten glass issues in small streams. The feeder may be heated and its temperature controlled by an electric current which flows through a circuit comprising the feeder and conductor bars 23 connected to and extending therefrom.

In order to achieve the objects of the invention, I use an alloy consisting of platinum and nickel. The proportions of the ingredients may be varied within suitable limits, ranging as follows:

| | Per cent |
|---|---|
| Platinum | 99.75 to 95 |
| Nickel | .25 to 5 |

The preferable ranges are:

| | Per cent |
|---|---|
| Platinum | 98 to 99.5 |
| Nickel | 0.5 to 2 |

As the proportion of nickel is increased above 2%, its oxidation begins to gradually increase until after 5% the alloy is substantially not workable. In this stage it is difficult to cold roll and very hard and in cold rolling it turns brittle. One of the greatest difficulties encountered with an alloy having more than 5% nickel is that the nickel oxidizes very rapidly and forms a scale on the surface, causing a roughness which increases the frictional resistance to the flow of glass thereover and also increases mechanical loss by erosion of the alloy as molten glass or the like flows thereover.

An excess amount of nickel also causes the alloy to swell and crack when subjected to high temperatures, accelerating mechanical destruction. Such cracks in bushings made of the alloy may admit air and may actually cause leakage of glass. In addition, the use of such excess of nickel causes the melting point of the alloy to be lowered more than 200° C., which renders the alloy substantially useless with high melting point glasses.

With less than 5% nickel, however, the oxidation rate is low and the alloy is stable, strong, workable, and capable of attaining and retaining a high smooth polish.

Unless as much as .25% nickel is used in the alloy, the beneficial effects imparted by the nickel are immaterial and the alloy behaves substantially as pure platinum.

For optimum results in strength, durability, chemical resistance and other desirable properties, as above noted, I have found that nickel within the range of 0.5% to 2% of the alloy, is most satisfactory.

I have also discovered that the presence of nickel in my alloy in the amounts noted, decreases the loss of platinum by volatilization in that there appears to be a preferential volatilization of the nickel in place of the platinum during the life of the alloy, thus saving expensive platinum at the expense of relatively inexpensive nickel. The volatilization factor, however, is very low and a glass working element composed of my alloy may be put into continuous use for long periods of time without failure or substantial deterioration.

Among the other properties of my platinum nickel alloy are:

1. That it is stable and may be used with molten glasses in contact therewith at temperatures up to and above 2800° F.;

2. The alloy is stable to chemical actions of any kind with molten soda-lime-silicate or borosilicate glasses or the like;

3. The alloy has high stability to chemical and mechanical actions of molten glass in contact therewith when continuously heated at the melting temperatures of the glass;

4. It may be rolled cold to any desired thickness and give a high polish to minimize friction, and while cold may be given any desired shape without any mechanical injury;

5. It does not oxidize appreciably when continuously electrically heated and maintained at high temperatures in contact with molten glass;

6. The alloy may be reworked, remelted and rerolled without changing its chemical and physical properties;

7. The coefficient of expansion of this alloy is very close to that of pure platinum; and 8. The heat conductivity of this alloy is about the same as that of commercially pure platinum and requires about the same time and electrical heat to bring it up to desired temperature.

Modifications and variations may be resorted to within the spirit and scope of the invention as defined in the appended claims.

I claim:

1. In a glass working and handling apparatus, a container for molten glass and a metallic element associated with the container and providing a passageway through which molten glass flows, said metallic element being in direct contact with the flowing glass and so positioned that the glass flows over one side thereof with the other side exposed to a gaseous medium while the element is subjected to a high temperature, said element formed of an alloy of at least 98% to 99.75% platinum and 0.25% to 2% nickel.

2. A metallic feeder for molten glass having an orifice outlet through which said glass flows at high temperature in direct contact with said feeder, said feeder composed of an alloy comprising 98% to 99.75% platinum and 0.25% to 2% nickel.

MICHEL B. VILENSKY.